(12) United States Patent
Choi

(10) Patent No.: US 8,158,067 B2
(45) Date of Patent: Apr. 17, 2012

(54) NOx REDUCTION DEVICE FOR DIESEL VEHICLES

(75) Inventor: Sung Mu Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 194 days.

(21) Appl. No.: 12/623,185

(22) Filed: Nov. 20, 2009

(65) Prior Publication Data
US 2011/0052452 A1 Mar. 3, 2011

(30) Foreign Application Priority Data
Sep. 2, 2009 (KR) .................. 10-2009-0082665

(51) Int. Cl.
*B01D 50/00* (2006.01)

(52) U.S. Cl. ........................................... 422/171
(58) Field of Classification Search .................. 422/177, 422/180
See application file for complete search history.

(56) References Cited

U.S. PATENT DOCUMENTS

| 7,451,593 B2 | 11/2008 | Nagaoka et al. |
| 2007/0012032 A1 * | 1/2007 | Hu .................................. 60/286 |

FOREIGN PATENT DOCUMENTS

| JP | 2002-276422 A | 9/2002 |
| JP | 2006-266192 A | 10/2006 |
| JP | 2007-296521 | 11/2007 |
| JP | 2008-075610 | 4/2008 |
| KR | 10-20060115939 A | 11/2006 |
| KR | 10-0836301 B1 | 6/2008 |
| KR | 10-20080114700 A | 12/2008 |
| WO | WO 97/16632 A1 | 5/1997 |

* cited by examiner

*Primary Examiner* — Tom Duong
(74) *Attorney, Agent, or Firm* — Morgan, Lewis & Bockius LLP

(57) ABSTRACT

A NOx reduction device for diesel vehicles includes an Lean NOx Trap (LNT) serving as a NOx filter, a Diesel Particulate Filter (DPF) located downstream of the LNT, and a Hydrocarbon-Selective Catalyst Reduction (HC-SCR) catalyst provided on the LNT. The HC-SCR catalyst can remove NOx in the regeneration of the DPF even if an additional post injector is not provided to promote an active reaction of the HC-SCR catalyst.

3 Claims, 4 Drawing Sheets

(a)

(b)

(a)                                (b)

NO$_x$ REDUCTION DEVICE FOR DIESEL VEHICLES

CROSS-REFERENCE TO RELATED APPLICATION

The present application claims priority of Korean Patent Application Number 10-2009-0082665 filed on Sep. 2, 2009, the entire contents of which application is incorporated herein for all purposes by this reference.

BACKGROUND OF THE INVENTION

1. Field of the Invention

The present invention relates to a NOx reduction device for diesel vehicles.

2. Description of Related Art

FIG. 1 is a schematic diagram illustrating a part of a conventional exhaust device for diesel vehicles, FIG. 2 is a graph illustrating the relationship of the temperature of exhaust gas with respect to time at an inlet of a particulate filter, and FIG. 3 is a graph illustrating the NOx purifying ratio of a NOx catalyst with respect to temperature.

The exhaust device for diesel vehicles has a function of removing nitrogen oxides, collectively referred to as NOx, and a function of removing soot when a predetermined volume or more of soot has accumulated.

The exhaust device for diesel vehicles is equipped with a Lean NOx Trap (LNT), also referred to as a de-NOx catalyst, and a recyclable Diesel Particulate Filter (DPF) for removing particulate matter such as soot.

As can be seen in FIG. 2, in the regeneration of the DPF, the temperature at the inlet of the DPF is required to be about 600° C. In order to obtain this temperature, a portion of the fuel being fed into the engine is introduced into the exhaust device to raise the temperature through oxidization, caused by the LNT.

A Hydrocarbon-Selective Catalyst Reduction (HC-SCR) catalyst is also provided, which removes NOx using hydrocarbon. For this, a post injector, which injects a necessary amount of fuel containing hydrocarbon, is provided.

Thus, the HC-SCR catalyst is not provided in a conventional exhaust device, which does not have a post injector.

As can be seen in FIG. 2, in the regeneration of a Diesel Fuel Catalyst (DFC), the temperature at the inlet of the DFC is about 600° C. As can be seen in FIG. 3, in the generation of the DFC at a temperature of 600° C. or more, the LNT generally does not ensure a NOx purifying ratio.

Accordingly, in the regeneration of the DPF, the conventional exhaust device for diesel vehicles shown in FIG. 1 disadvantageously emits NOx as it is.

Furthermore, in the regeneration of the DPF, Exhaust Gas Recirculation (EGR) is generally turned off in order to stably purify soot. At this time, the LNT does not efficiently remove NOx whereas the amount of NOx emissions increases up to 5 to 20 times more than normal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a NOx reduction device for diesel vehicles, which is configured to reduce the amount of NOx emissions in the regeneration of a Diesel Particulate Filter (DPF) even if an exhaust device for diesel vehicles includes a Lean NOx Trap (LNT) without a post injector.

In an aspect of the present invention, the NOx reduction device for diesel vehicles may include an LNT serving as a NOx filter, a DPF located downstream of the LNT, and a Hydrocarbon-Selective Catalyst Reduction (HC-SCR) catalyst provided on the LNT.

The LNT may include a diesel oxidation catalyst. The HC-SCR catalyst may be made of one selected from the group consisting of Cu/zeolite, Ag/Al$_2$O$_3$, a compound of Cu/zeolite and Ag/Al$_2$O$_3$, and equivalents thereof.

According to various embodiments of the invention, the HC-SCR catalyst can remove NOx in the regeneration of the DPF even if an additional post injector is not provided to promote an active reaction of the HC-SCR catalyst.

Furthermore, according to various embodiments of the invention, NOx can be effectively removed in the regeneration of the DPF where the LNT is not operated.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
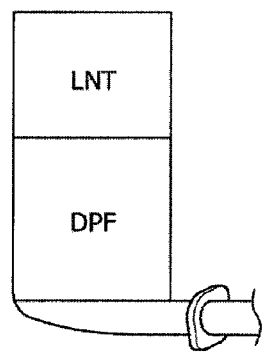
FIG. 1 is a schematic diagram illustrating a part of a conventional exhaust device for diesel vehicles.
Figure 2:
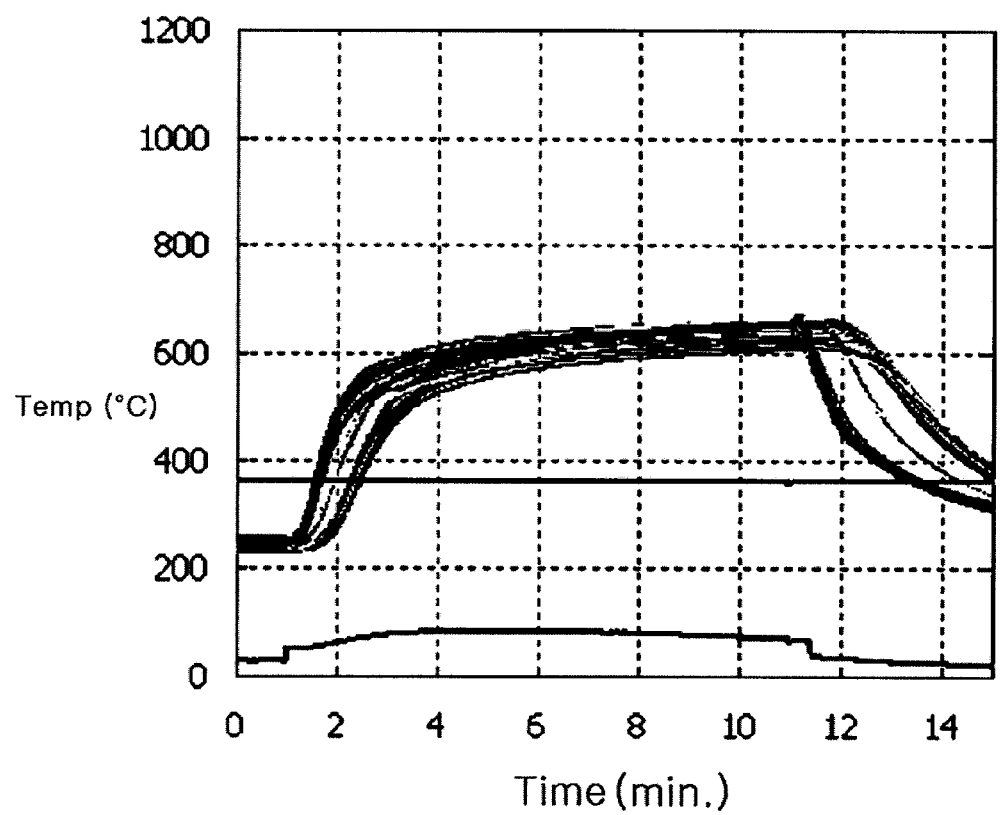
FIG. 2 is a graph illustrating the relationship of the temperature of exhaust gas with respect to time at an inlet of a particulate filter.
Figure 3:
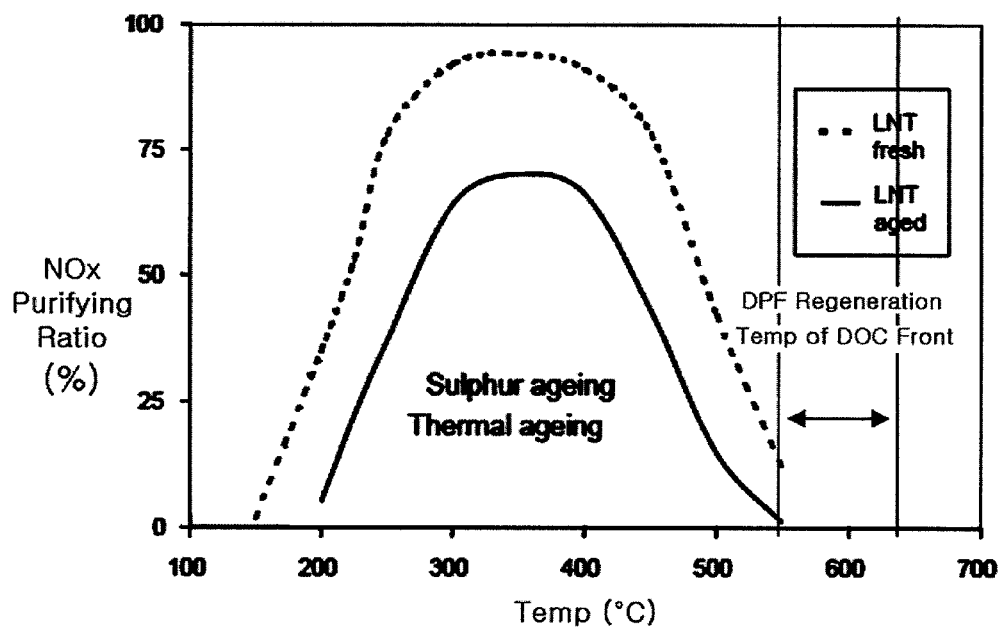
FIG. 3 is a graph illustrating the NOx purifying ratio of a NOx catalyst with respect to temperature.
Figure 4:
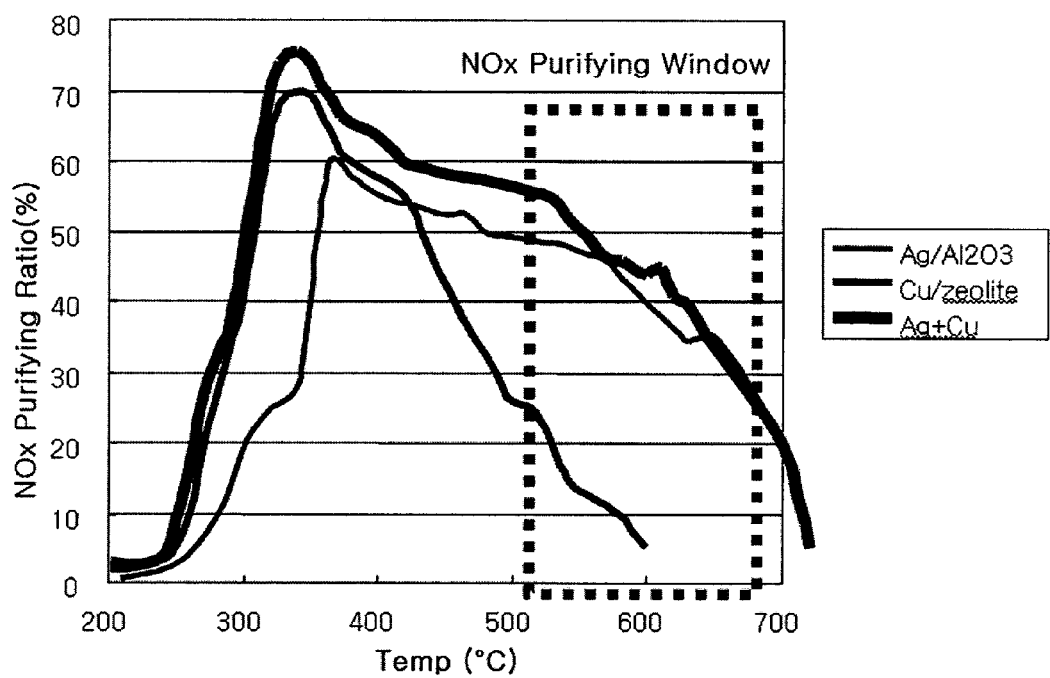
FIG. 4 is a graph illustrating the NOx purifying ratio of a Hydrocarbon-Selective Catalyst Reduction (HC-SCR) catalyst with respect to temperature in accordance with the present invention.
Figure 5:
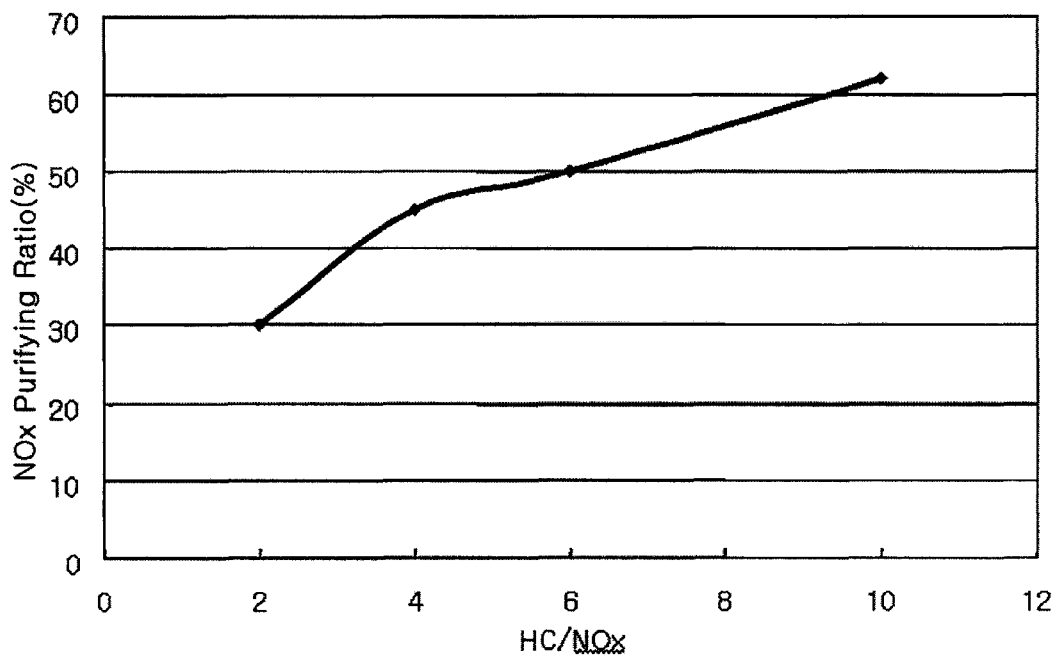
FIG. 5 is a graph illustrating the NOx purifying ratio at 550° C.
Figure 6:
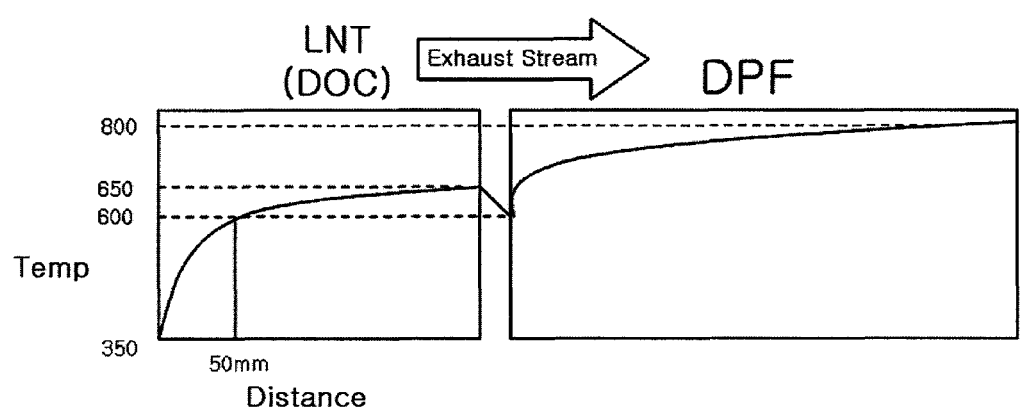
FIG. 6 is a graph schematically illustrating the temperature distribution in the regeneration of a Diesel Oxidation Catalyst (DOC) and a Diesel Particulate Filter (DPF).

FIG. 4 is a graph illustrating the NOx purifying ratio of a Hydrocarbon-Selective Catalyst Reduction (HC-SCR) catalyst with respect to temperature in accordance with various embodiments of the invention, FIG. 5 is a graph illustrating the NOx purifying ratio at 550° C., and FIG. 6 is a graph schematically illustrating the temperature distribution in the regeneration of a Diesel Oxidation Catalyst (DOC) and a Diesel Particulate Filter (DPF).

The key feature of the present invention is to provide a structure that can effectively remove NOx even in the regeneration of the DPF by providing the HC-SCR catalyst in an exhaust device without a post injector. (Herein, the term "HC-SCR catalyst" will also be referred to as "HS selective reduction catalyst.")

More specifically, a NOx reduction device for diesel vehicles in accordance with various embodiments of the invention includes a Lean NOx Trap (LNT) serving as a NOx filter, the DPF located downstream of the lean NOx trap, and the HC-SCR catalyst provided on the LNT.

The LNT can include a DOC or have a DOC function, and the HC-SCR catalyst can be made of Cu/zeolite, $Ag/Al_2O_3$, a compound of Cu/zeolite and $Ag/Al_2O_3$, or an equivalent thereof.

First, the following discussion will present the NOx purifying ratio of the HC-SCR catalyst with respect to temperature.

Referring to the NOx purifying ratio of the HC-SCR catalyst with respect to temperature shown in FIG. 4, in the regeneration of the DPF, the NOx purifying ratio represents 30% to 50% at a temperature of approximately 600° C.

In addition, as can be seen in FIG. 5, when the NOx purifying ratio was measured by increasing the HC/NOx ratio (i.e., the hydrocarbon to NOx ratio) in an approximate temperature range in the regeneration of the DPF, it was observed that the NOx purifying ratio increased from 30% to 60% in response to an increase in the concentration of hydrocarbon.

In addition, the LNT can serve as a Diesel Oxidation Catalyst (DOC) using a number of noble metal components contained therein.

As seen in FIG. 6, in the regeneration of the DPF, the temperature distribution of the DOC of the LNT and the temperature distribution of the DPF vary along the length of an exhaust stream. In the regeneration, the temperature of the DOC is 350° C. at the front point, is 600° C. at a position of 50 mm from the front point, and rises up to 650° C. at the rear point. The temperature of the DOC then drops to 600° C. at the inlet of the DPF.

Figure 7:
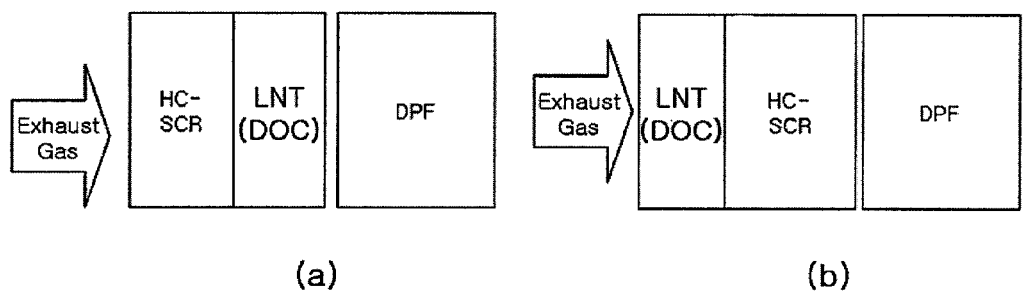
FIGS. 7A and 7B are block diagrams each of which schematically illustrates a position where the HC-SCR catalyst is provided.
Figure 8:
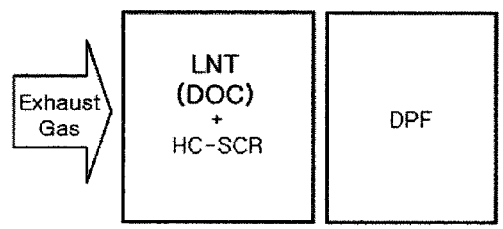
FIG. 8 is a block diagram schematically illustrating another position where the HC-SCR catalyst is provided.

FIGS. 7A and 7B are block diagrams each of which schematically illustrates a position where the HC-SCR catalyst is provided, and FIG. 8 is a block diagram schematically illustrating another position where the HC-SCR catalyst is provided.

In the exhaust device including the LNT and the DPF according to various embodiments of the invention, as shown in FIG. 7A, the HC-SCR catalyst can be located on the front (e.g., the inlet) of the LNT serving as a DOC. As shown in FIG. 7B, the HC-SCR catalyst can also be located on the rear (e.g., the outlet) of the LNT (DOC). In addition, as shown in FIG. 8, the HC-SCR catalyst can be located inside the LNT (DOC).

The HC-SCR catalyst is made of Cu/zeolite, $Ag/Al_2O_3$, a compound of Cu/zeolite and $Ag/Al_2O_3$, or an equivalent thereof.

As shown in FIGS. 7A, 7B, and 8, the HC-SCR catalyst, provided on a specific position of the LNT serving as a DOC, is located in front of the DPF to perform the following functions.

First, before the regeneration of the DPF is started, the LNT removes NOx since the temperature is lower than what is necessary for the regeneration of the DPF. The HC-SCR catalyst also serves to remove NOx using hydrocarbon, which is introduced into the exhaust device.

In the regeneration of the DPF to remove soot accumulated on the inlet of the DPF, a portion of fuel is introduced into the exhaust device so that hydrocarbon in the fuel reacts with oxygen ($O_2$) on the DOC of the LNT, thereby raising the temperature of the inlet of the DPF.

At this time, the amount of NOx emissions increases significantly since the LNT does not remove NOx and Exhaust Gas Recirculation (EGR) is also turned off during the regeneration of the DPF. However, a great amount of hydrocarbon in the fuel promotes the reaction of the HC-SCR catalyst so as to actively remove NOx from the HC-SCR catalyst.

According to various embodiments of the invention as set forth above, the HC-SCR catalyst can remove NOx in the regeneration of the DPF even if an additional post injector is not provided to promote an active reaction of the HC-SCR catalyst.

Furthermore, according various embodiments of the invention as set forth above, NOx can be effectively removed in the regeneration of the DPF where the LNT is not operated.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A NOx reduction device for diesel vehicles, comprising:
   a lean NOx trap;
   a diesel particulate filter located downstream of the lean NOx trap; and
   a hydrocarbon selective catalyst reduction (HC-SCR) catalyst provided on the lean NOx trap,
   wherein the lean NOx trap comprises a diesel oxidation catalyst.

2. The NOx reduction device in accordance with claim 1, wherein the HC-SCR catalyst is made of one selected from the group consisting of Cu/zeolite, Ag/Al2O3, a compound of Cu/zeolite and Ag/Al2O3, and equivalents thereof.

3. The NOx reduction device in accordance with claim 1, wherein the HC-SCR catalyst is made of one selected from the group consisting of Cu/zeolite, Ag/Al2O3, a compound of Cu/zeolite and Ag/Al2O3, and equivalents thereof.

* * * * *